United States Patent [19]

Peter

[11] Patent Number: 5,097,703
[45] Date of Patent: Mar. 24, 1992

[54] CAPACITIVE PROBE FOR USE IN A SYSTEM FOR REMOTELY MEASURING THE LEVEL OF FLUIDS

[75] Inventor: Hochstein Peter, Troy, Mich.

[73] Assignee: Aisin Seiki Kabushiki Kaisha, Japan

[21] Appl. No.: 54,050

[22] Filed: May 26, 1987

Related U.S. Application Data

[63] Continuation of Ser. No. 677,048, Nov. 30, 1984, abandoned.

[51] Int. Cl.$^5$ .............................................. G01F 23/26
[52] U.S. Cl. ................................ 73/304 C; 361/284
[58] Field of Search .............. 73/304 C; 200/61.05; 340/620; 361/284, 301; 324/61 P

[56] References Cited

U.S. PATENT DOCUMENTS

| | | | |
|---|---|---|---|
| 2,683,371 | 7/1954 | Droin et al. | 361/284 |
| 2,699,523 | 1/1955 | Myers | 361/284 |
| 2,752,543 | 6/1956 | Smith | 361/284 |
| 3,037,165 | 5/1962 | Kerr | 73/304 C |
| 3,218,526 | 11/1965 | Tuttle | 361/284 |
| 3,226,615 | 12/1965 | Nagel | 324/61 P |
| 3,262,032 | 7/1966 | Levine et al. | 361/284 |
| 3,588,859 | 6/1971 | Petree | 361/284 |
| 3,831,069 | 8/1974 | Merrell et al. | 73/304 C |
| 3,935,739 | 2/1976 | Ells | 73/304 C |
| 3,950,653 | 4/1976 | Kirkpatrick | 361/284 |
| 3,958,159 | 5/1976 | Rauchwerger | 361/284 |
| 4,038,871 | 8/1977 | Edwards | 73/304 C |
| 4,184,369 | 1/1980 | Jung et al. | 361/284 |
| 4,194,395 | 3/1980 | Wood | 73/304 C |
| 4,316,174 | 2/1982 | Sutton et al. | 340/620 |
| 4,354,219 | 10/1982 | Akita | 73/304 C |
| 4,399,699 | 8/1983 | Fujishiro | 73/304 C |
| 4,543,823 | 10/1985 | Nag et al. | 73/304 C |
| 4,574,328 | 3/1986 | Maier | 73/304 C |
| 4,591,839 | 5/1986 | Charboneau | 340/620 |
| 4,638,291 | 1/1987 | Puscasu | 340/620 |

FOREIGN PATENT DOCUMENTS

220669  11/1957  Australia ............................ 361/284

Primary Examiner—Thomas B. Will
Attorney, Agent, or Firm—Banner, Birch, McKie & Beckett

[57] ABSTRACT

A capacitive probe for use in a system for remotely measuring the level of fluids. The probe is continuously charged and discharged. The discharge current from the probe is measured and converted to a corresponding voltage rerepresenting the level of fluid. The voltage is then supplied to an indicating device. One embodiment of the probe includes first and second spaced supports which maintain a plurality of spaced parallel wire electrodes which form two capacitive plates. In a further embodiment of the probe, the wire electrodes are positioned on an integrally formed support.

10 Claims, 3 Drawing Sheets

CAPACITIVE PROBE FOR USE IN A SYSTEM FOR REMOTELY MEASURING THE LEVEL OF FLUIDS

This application is a continuation of application Ser. No. 677,048, filed Nov. 30, 1984 now abandoned.

BACKGROUND OF THE INVENTION

The present invention relates generally to the field of measuring devices, and more particularly, is directed to a system for remotely measuring the level of contained fluids and other media.

Many types of level sensors are known in the prior art for remotely measuring the level of fluids, powders and granular material contained in tanks and bins. The sophistication and accuracy of these devices vary with the requirements of the application. Non-contact level sensing instruments using ultrasonic or radiation detectors are among the most sophisticated and accurate measuring devices in use today. Because of their complexity and cost, however, these devices are restricted to industrial and commercial applications. Designers of level sensors for consumer applications, such as for use in automobiles and trucks, have traditionally placed the greatest effort on keeping cost low. Thus, most such sensors are rudimentary float based devices which produce an electrical signal proportional to the fluid level being measured. Such devices have not proved reliable for measuring the level of fluids in non-stationary containers such as the oil reservoir and fuel tank in an automobile or truck. More sophisticated level sensors using a capacitance principle have been used in aircraft and experimentally evaluated in automotive applications. These designs were complicated, fairly expensive, required special wiring and could not endure the operating environment imposed by vehicular use.

Capacitive level sensors known in the prior art utilized frequency sensitive circuitry wherein a change in sensor capacitance caused by a change in the dielectric constant of the surrounding medium produces a change in the frequency of a high frequency oscillator. It is well established that oscillator frequency varies as a function of $f = (2n\sqrt{LC})^{-1}$ for an LC (inductance-capacitance) oscillator and that time constant t changes for an RC (resistance-capacitance) oscillator. The changes in f or t are minimal for small changes in "C". Sensitivity of the oscillator frequency to environmental changes (humidity, temperature, vibration, etc.) must necessarily be kept low if the typically small changes in sensor capacitance are to be measured with any precision. Another problem with prior art capacitive level sensors, and perhaps the most serious, is the requirement to measure very small changes in capacitance. These changes are typically on the order of 10 pF or less for reasonably sized sensors. It is known that the capacitance of a multiplate capacitor is given as follows:

$$CpF = 0.0885 \times KS(N-1)d^{-1}$$

where
K = dielectic constant
S = area of each plate in cm$^2$
N = number of plates
d = thickness of dielectric in cm.

Unless a large number of parallel plates are used, the actual capacitance value of a sensor of practical size is relatively low. This is especially true when the interplate spacing of one the order of several millimeters. Minimal plate spacing of one mm or more may be required, however, because, as discovered in various experiments, the surface tension and viscosity of some fluids (motor oil for example) induces capillary attraction between the capacitor plates, thereby causing erroneous readings. The ability of the sensor to shed fluid after submersion and subsequent removal from the fluid is an important consideration in many applications. This property is also a function of surface tension and viscosity. Low capacitance sensors with relatively wide interplate spacing assure proper fluid drain-down and minimizes capillary "wicking".

In measuring the small change in sensor capacitance due to the presence or absence of surrounding fluid (or other media), the added shunt capacitance of the sensor leads is an important consideration as well. If the shunt capacitance of the leads constitutes an appreciable fraction of the sensor net capacitance, the signal to noise ratio of the system deteriorates, i.e., the minimum resolution of the sensor diminishes.

U.S. Pat. No. 4,214,479 to Maier discloses a capacitive type sensor used to measure the mass of fuel in a fuel tank. The probe is connected to a source of power for supplying current to the probe capacitor and is immersed in the mass of fuel. The probe capacitor current is summed with a current corresponding to the capacitance of the fuel tank in the empty state to provide an output voltage. The output voltage is positively integrated to a predetermined value as determined by the number of pulses counted by a counter. The count is then actuated to count down the number of pulses required to return the integrated output voltage to zero. The number of pulses counted down provides a digital representation proportional to the mass of fuel sensed by the probe capacitor.

Also known in the prior art are a number of sensor probe configurations used with measuring systems of various types. For example, U.S. Pat. No. 4,329,644 to Libertini et al. discloses a high temperature probe for detecting shaft or rotor speed in a gas turbine engine. As shown in FIG. 4, the probe comprises a housing 2 which receives electrode assemblies 4 and 5. Each electrode assembly is surrounded by air gap 32 and is held in position by a pair of insulating rings 8 and 9 formed of synthetic sapphire. The other structural elements in the probe are formed from KOVAR.

U.S. Pat. No. 4,314,428 to Beaman discloses a capacitance probe comprising at least two parallel blades. The blades are generally rectangular in construction and are of relatively large surface area.

U.S. Pat. No. 3,918,306 to Maltby discloses a system for measuring vehicle transmission fluid based on the capacitance between a pair of probes. The probes are coupled to an impedance network. In order to compensate for changes in transmission fluid level due to changes in temperature, the network includes a temperature sensitive impedance.

British Patent No. 989,618 discloses a liquid measurement device which has a first probe formed of a continuous length of wire disposed in a plurality of parallel paths extending lengthwise within a cylindrical structure. The cylindrical structure forms the second electrode.

While the above described measuring systems known in the prior art perhaps represent an improvement over older such systems, they remain deficient in a number of areas. For example, the Maier level measuring device requires a number of component parts to operate and cannot be used in high temperature environments. At low temperature, many fluids, such as oil for example, are highly viscous and tend to adhere to adjacent parts. Thus, in a level measuring system that uses a solid cylinder such as disclosed in the above cited British patent, the oil collects on the surface and is difficult to shed. If the oil is not readily shed, the sensor provides a false reading. Moreover, the parallel probe element must be positioned close to the cylinder in order to get a measurable change in capacitance as the fluid level changes. The closer the parallel probe element is to the cylinder, however, the less likely the oil will shed from the sensor and provide an accurate reading. Also, in probes of the type disclosed in the Beaman patent, it is difficult to align the probe blades with respect to the fluid surface. Such probes must be aligned perpendicular to the surface of the fluid in order to achieve maximum sensitivity. This is often difficult to do because the probe tip is not always visible during installations and use. Accordingly, there is an unfilled need in the art for a fluid level measuring system which is reliable in operation, easy to install and low in cost.

SUMMARY OF THE INVENTION

It is a specific object of the present invention to provide a fluid level measuring system which is simple in construction and reliable in operation.

It is another specific object of the present invention to provide a fluid level measuring system which is low in cost.

It is another specific object of the present invention to provide a fluid level measuring system which can be easily installed.

It is a still further specific object of the present invention to provide a fluid level measuring system which can operate reliably in harsh environments.

It is another specific object of the present invention to provide a fluid level measuring system which is compact in size and structurally rugged.

The present invention is directed to a low cost miniature capacitive level measuring system which has wide application in automotive, truck, marine and industrial installations. The invention overcomes the above noted deficiencies in capacitive level measuring systems known in the prior art. In one embodiment of the invention, the capacitive probe comprises two rigid wires formed in a bifilar helix. Thus, small changes in fluid level effect relatively large changes in probe capacitance because the multiple plates of the probe are simultaneously immersed in the fluid. Another advantage of helical geometry is that the sensing probe is compact, stable, rugged and low in cost. Since the helix can be fabricated from any conductive material, the probe may be adapted to virtually any operating environment, such a heat, corrosive atmospheres, etc. The helix may also be entirely self-supporting or may be formed around a tubular support structure.

The capacitive probe is connected to a current measuring circuit which measures the discharge current of the probe. Since the charge stored in a capacitor is given by the relationship Q=CE, where Q equals Coulombs, C equals Farads and E equals voltage, the capacitance of a capacitor may be determined by cyclically charging the capacitor and then discharging it through a current measuring circuit. A charge pump running at about 10 KHz is used to charge the capacitive probe of the invention. The linear function of capacitor current versus capacitance is translated into a voltage across a filtering capacitor. A voltage follower is connected to the filtering capacitor to produce an output voltage linearly proportional to the charge, i.e., capacitance, of the capacitive probe. Alternatively, a comparator circuit may be connected across the filtering capacitor to develop a high or low signal for probe capacitance levels above or below a given setpoint.

The fluid level measuring system of the present invention also includes a high-performance thermal insulator for thermally insulating the system's electronic circuitry from the sensor probe. The system can, therefore, be used to monitor the level of fluids in elevated temperature environments, such as the oil level in an automotive engine. A thermally conductive enclosure is also provided for the electronic circuitry. The enclosure dissipates any conducted heat to the ambient air surrounding the enclosure. The fluid level measuring system of the invention also includes two additional embodiments of the sensing probe. One embodiment is of multi-wire parallel rod construction and the other embodiment is an alternate design for a multi-wire probe. In the latter embodiment, alternate electrodes are made part of an interlocking die cast structure whereby they are held in a fixed relationship to one another. This construction provides low manufacturing costs and high rigidity in a high vibration environment.

DESCRIPTION OF THE PREFERRED EMBODIMENT

The present invention is directed to a low cost miniature capacitive level measuring system which has wide application in various automotive, truck, marine and industrial installations.

In capacitive level measuring systems known in the prior art, the sensor probe forms part of an LC oscillator having a frequency representative of fluid level. The capacitance of the sensor probe, and thus, the frequency of the oscillator, is determined by the dielectric constant of the surrounding fluid. Sensitivity of the oscillator frequency to environmental changes must be kept low if the typically small changes in probe capacitance are to be accurately measured. Moreover, unless a large number of parallel plates are used to form the probe, the change in probe capacitance due to a change in fluid level may be too small to produce a meaningful change in oscillator frequency. In addition, the change in oscillator frequency resulting from a change in probe capacitance is non-linear. Thus, means for linearizing the change in frequency must be provided.

Rather than change the frequency of an oscillator, the capacitive level measuring system of the present invention measures the capacitance of the sensor probe by measuring the amount of net energy stored in the probe. Since the charge stored in a capacitor is Q=CE, where Q is in Coulombs, C in Farads, and E in Volts, the capacitance of a capacitor may be determined by cylically charging the capacitor and then discharging it through a current measuring circuit. By using a so-called charge pump running at about 10 kHz, the circuit shown in FIG. 1 measures the effective current through the sensor probe, and thus its capacitance, by continuous charge-discharge cycling so that $I_{(cap)} \propto C_oVf$. This linear function of capacitor current versus capacitance is converted into a voltage across a filtering capacitor. A comparator is then used to develop a high or low logic signal for capacitance (voltage) levels above or below a given set-point.

Figure 1:
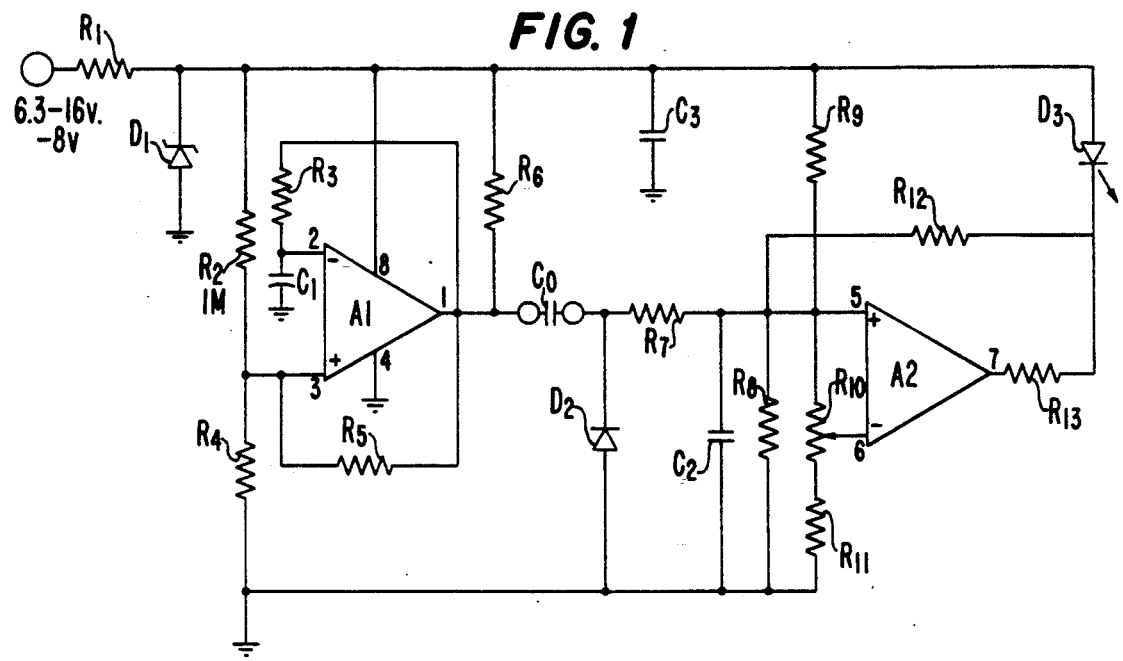
FIG. 1 is a schematic diagram of a circuit for measuring the capacitance of a capactive probe in accordance with the present invention.

As shown in FIG. 1, operational amplifier A1 is connected as a square wave generator which acts as a charge pump for capacitor $C_o$, the level sensing probe. The charge stored in capacitor $C_o$ during each cycle is discharged through diode $D_2$. When the output of the square wave generator goes positive, capacitor $C_o$ charges to the supply voltage (6.2 volts for example), with the charge current flowing through resistor $R_7$. The voltage developed at non-inverting input 5 of operational amplifier A2 is compared to the set-point voltage established at inverting input 6 by a voltage divider network which includes variable resistor R10. Operational amplifier A2 is connected as a comparator with positive feedback through resistor R12 to establish some hysteresis, thereby preventing "hunting" around the set-point. Whenever the voltage at input 5 of the comparator falls below the set-point voltage established at input 6, the comparator sinks output pin 7 to ground, thereby illuminating LED D3. With the component values shown below in Table 1, and a capacitive probe with a free air capacitance of approximately 10 pF, a change of 10 pF (additional) yields an increase in voltage at input 5 of comparator A2 of about 0.5 volts. Thus, excellent sensitivity to small changes in probe capacitance is obtained.

TABLE 1

| Component | Value |
|---|---|
| R1 | 100 |
| R2 | 1 M |
| R3 | 100 K |
| R4 | 1 M |
| R5 | 1 M |
| R6 | 15 K |
| R7 | 100 K |
| R8 | 10 M |
| R9 | 10 K |
| R10 | 2 K |
| R11 | 5.1 K |
| R12 | 20 M |
| R13 | 470 |
| C1 | .001μ |
| C2 | .01μ |
| C3 | .1μ |

Operational amplifier A2 could also be connected as a voltage follower (buffer) to yield an output voltage linearly proportional to the change in capacitance of the probe.

Figure 4:
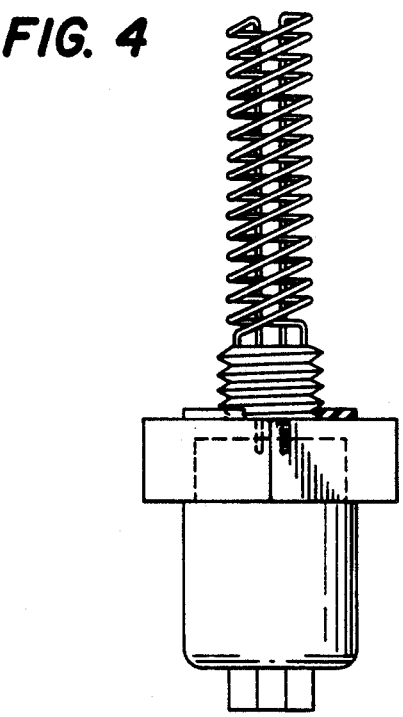
FIG. 4 illustrates a sensing probe of helical construction.

One embodiment of a capacitive probe which may be used with the circuit shown in FIG. 1 is illustrated in FIG. 4. As shown, the probe consist of two rigid wires formed in a bifilar helix. The helix is formed as two lead screws with independent electrodes. The term "coil" is not used as that would infer an inductor when in fact the design of the helix is induction cancelling, an advantage in and of itself.

Figure 5:
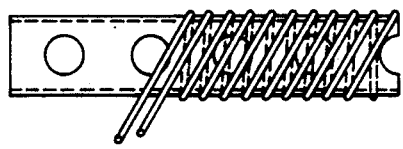
FIGS. 5 and 6 illustrates the sensing probe of FIG. 4 wound on self supporting forms.
Figure 6:
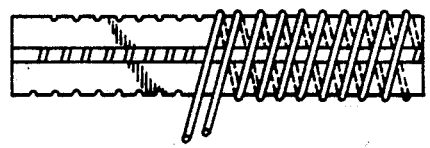

Depending upon the specific wire size, materials of construction, etc., the helix structure may be entirely self-supporting or may be formed around a tubular or cruciform support structure as shown in FIGS. 5 and 6. The cruciform support minimizes contact with the helix and therefore presents a minimal surface for the measured medium to cling to.

It has been found that a probe for use in measuring the level of oil should comprise an entirely self supporting helix made of stainless steel wire 0.030 to 0.050 in diameter wound in a two lead "thread". By terminating all wire ends in an integrally molded (insert mold) high temperture thermoplastic structure, a high degree of rigidity and structural integrity is realized. Since some media which would be sensed are conductive or become conductive at elevated temperature (motor oil for example), the electrodes or "plates" of the probe must be insulated. It has been found that commercially available polyimide wire coatings perform well in various hostile environments and can be applied to a stainless steel wire helix.

The typical helix should have an outside diameter of 0.40 inch and a length of 1.5 inches. With a six thread per inch pitch for each interleaved lead, the free air capacitance of the probe is nominally 10 pF and increases to approximatly 22 pF when immersed in a medium with a dielectric constant of two.

Figure 2:
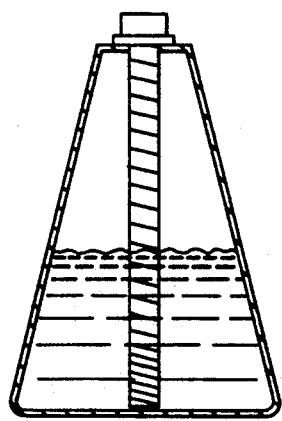
FIGS. 2 and 3 illustrate the variable pitch in a sensing probe of helical construction used to measure the level of fluid in an irregularly shaped container.
Figure 3:
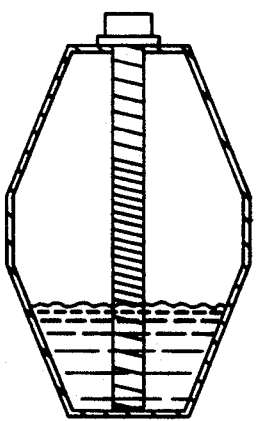

In some applications, the volume of fluid in a tank is not a linear function of fluid height, such as in trapezoidal gas tanks. For such applications, the helical capacitive probe may be wound with a non-linear pitch to compensate for such variations and still provide an accurate readout of actual fluid volume in the tank. A capacitive probe incorporating a non-linear helix is shown schematically in FIGS. 2 and 3.

Figure 7:
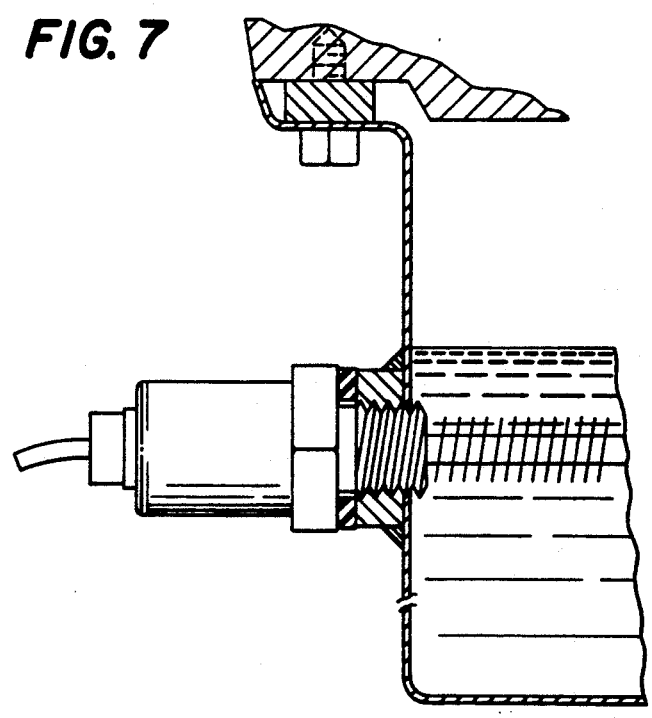
FIG. 7 illustrates the installation of a fluid level measuring system in accordance with the present invention.

When used as an oil level sensor, particularly in the oil pan of a motor vehicle, the wire formed double helix capacitive probe offers important practical advantages. When used as shown in FIG. 7, the horizontal mounting allows small oil level changes to effect relatively large changes in probe capacitance because the multiple "plates" of the probe are simultaneously immersed in the oil. For a switching or on-off type of measurement, such large changes in capacitance are advantageous because the signal to noise ratio of the system is improved and the level or height discrimination is enhanced.

The helical electrode structure, particularly in self-supporting form, allows oil to drain through and off the sensor with little resistance. At low temperatures where motor oil becomes very viscous, shedding the oil from the probe helix become more difficult but performance is still vastly superior to other types of plate electrode configurations.

Another advantage of the helical geometry is that the probe is compact, stable, rugged and low in cost. Since the helix can be fabricated from any conductive material, the probe may be adapted to virtually any operating environment including high temperature and corrosive atmospheres.

The relatively small changes in probe capacitance precludes the use of remote electronics connected by means of a cable to the probe in the container holding the fluid. The shunt capacitance of the interconnection cable would swamp the measured variable. Placing the electronics close to the probe overcomes this difficulty, but in high temperature environments, introduces another problem: temperature instability. Thermally isolating the electronics and their immediate enclosure from the heat source becomes critically important. A non-metallic insulator for the capacitive sensing electronics has been found to provide the required thermal insulation. Additionally, in particularly severe environments, a thermally conductive housing or cover for the circuitry assures effective dissipation of conducted heat to the surrounding ambient. By interposing a thermal insulator between the heat source and the sensing electronics and by further effectively dissipating any conducted heat to the ambient, the reliability of the level sensing system is greatly increased.

A polyetherimide glass reinforced thermoplastic such as G.E. Ultem 6200, which can be readily molded with integral threads, conveniently provides the necessary mechanical integrity, temperature resistance and electrical insulation properties required of the insulator structure. A drawn aluminum or steel case is then used to cover the electrinic circuit board and can be crimped onto the insulator structure.

Figure 8:
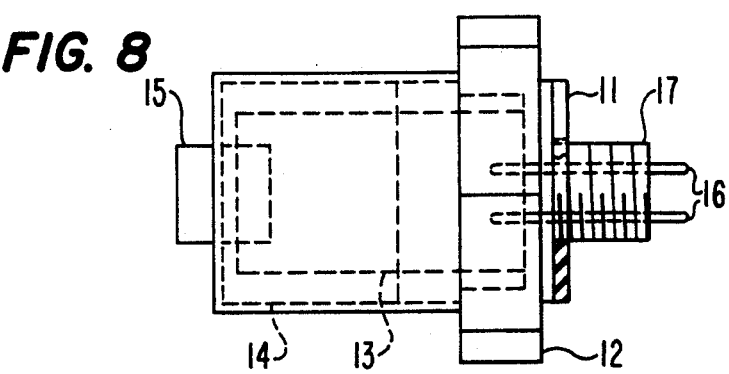
FIG. 8 illustrates the fluid level measuring system of the present invention with a thermal insulator and thermally conductive case.

FIG. 8 illustrates the level measuring system of the present invention with the above described thermal insulator and case. Integrally molded threads 17 are provided for securing the system to the container holding the fluid to be measured. Gasket 11 forms an effective fluid seal between the container and the system. The thermal insulator 12 insulates circuit board 13 holding the sensing electronics. Case 14 dissipates internal heat to the ambient air so that the operation temperature of the sensing electronics is maintained at a safe level. Terminals 16 and connector 15 are provided for connection to the sensing probe and measurement indicator, respectively.

Figure 11:
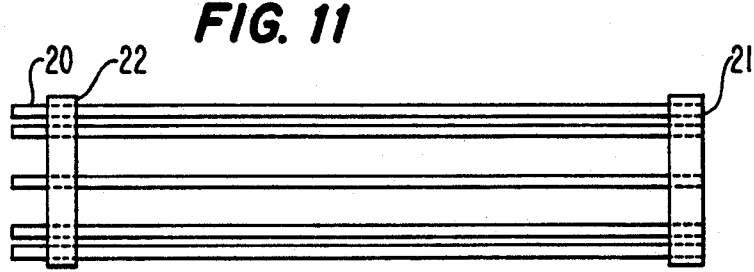
Figure 12:
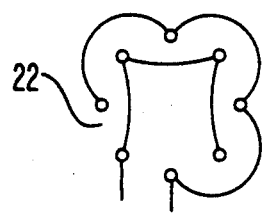

Another embodiment of a capacitive probe which may be used with the sensing circuit shown in FIG. 1 is illustrated in FIG. 11. The probe in this embodiment is of multi-wire parallel construction. Each capacitive plate of the probe comprises a plurality of parallel electrode wires 20 constrained at both ends by end pieces 21 and 22. Due to the relative shortness of the probe, about 1½ inches, and coated wires 20 of 0.045 inch in diameter, the probe is structurally very strong. FIG. 12 illustrates one example of a connection scheme for the multi-wire parallel probe shown in FIG. 11.

Figure 9:
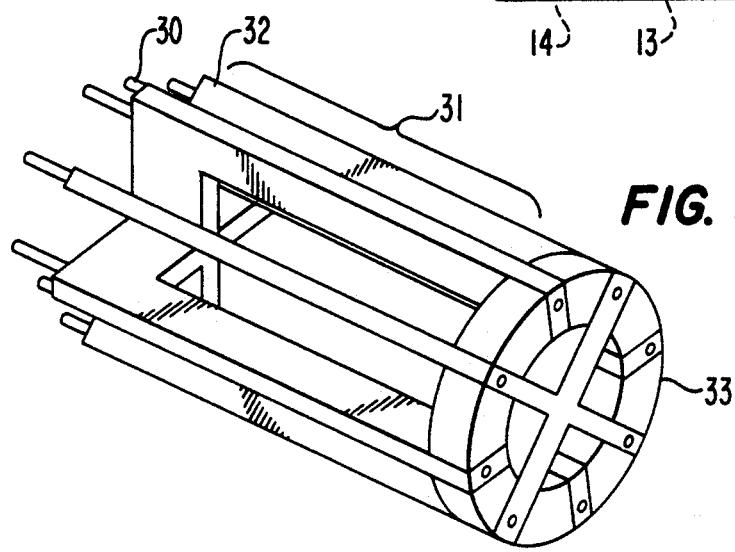
FIGS. 9-12 illustrate alternative constructions for the sensing probe of the fluid level measuring system of the present invention.
Figure 10:
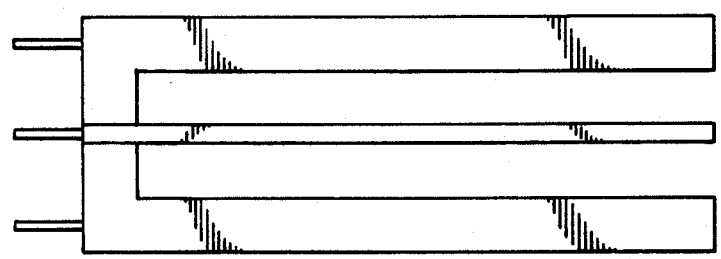

A further embodiment of a capactive probe which may be used with the sensing circuit shown in FIG. 1 is illustrated in FIGS. 9 and 10. This embodiment is a modification of the probe shown in FIG. 11. As shown in FIG. 9, the probe is formed around integrally formed structure 31. Structure 31 has a pair of elements with multiple interlocking and spaced radial bars 32. Bars 32 are radially disposed about a cylindrical axis and are held in fixed relationship to one another by retaining ring 33 which may be formed of plastic. Structure 31 may also be cast with mounting pins 30. Aside from the very low manufacturing cost of this embodiment, the rigidity provided by the radial bars and their retaining rings makes this probe structure ideal for high vibration environments.

This invention has been described in detail in connection with a preferred embodiment, but this embodiment is merely for example only and this invention is not restricted thereto. It will be easily understood by those skilled in the art that other variations and modifications can be easily made within the scope of this invention, as defined by the appended claims.

I claim:

1. A capacitive probe for use in a system for remotely measuring the level of fluid in a container, said probe comprising:
   capacitive probe means for immersion in a fluid, the capacitance of said probe being dependent on the level of said fluid;
   evaluation means coupled adjacent to said capacitive probe means for measuring the capacitance of said capacitive probe means and providing a corresponding signal, said evaluation means comprising:
   oscillator means for charging said capacitive probe to a charge voltage corresponding to the capacitance of said probe;
   discharge means for discharging said probe and converting the discharge current to a corresponding discharge voltage;
   reference voltage means for providing a reference voltage; and
   comparator means coupled to said discharge means and said reference voltage means for comparing the value of said discharge voltage to the value of said reference voltage and providing said corresponding signal in accordance with the comparison; and
   enclosure means over said evaluation means for thermally sealing said evaluation means.

2. The probe of claim 1 wherein said enclosure means includes secondary enclosure means around said evaluation means for thermally insulating said evaluation means from said enclosure.

3. The probe of claim 1 wherein said enclosure means further includes integrally molded threads for securing said probe to said container containing the fluid to be measured.

4. The probe of claim 1 wherein said enclosure means further includes gasket means between said enclosure and said container.

5. The probe of claim 1 wherein said capacitive probe comprises:
   spaced first and second end support pieces; and
   a plurality of spaced parallel wire electrodes attached to said end support pieces, said plurality of wire electrodes forming two capacitive plates, wherein each of said plates includes at least two of said wire electrodes.

6. The capacitive probe of claim 5 wherein the spaces between said first and second end support pieces is substantially 1½ inches.

7. The capacitive probe of claim 5 wherein said wire electrodes are substantially 0.045 inch in diameter.

8. The probe of claim 1 wherein said discharge means includes a diode and an impedance.

9. The probe of claim 8 wherein said comparator means includes positive feedback means for establishing a hysteresis range with respect to the comparison of said discharge voltage to said reference voltage and the providing of said corresponding signal.

10. The probe of claim 9 wherein said corresponding signal is a linear voltage which is proportional to the capacitance of said probe.

* * * * *